United States Patent [19]

Baker et al.

[11] 3,997,002
[45] Dec. 14, 1976

[54] AIRCRAFT MUFFLER AND HEATER ASSEMBLY

[75] Inventors: Marvin E. Baker, Boerne; Charles D. Nichols, San Antonio, both of Tex.

[73] Assignee: Wall Colmonoy Corporation, Detroit, Mich.

[22] Filed: July 16, 1975

[21] Appl. No.: 596,401

[52] U.S. Cl. .......................... 165/154; 237/12.3 A; 165/76; 60/320
[51] Int. Cl.² .......................................... F28D 7/10
[58] Field of Search ........................ 165/154–156, 165/129, 131, 130, 76, 154.5; 237/12.3 R, 12.3 A; 285/410, 411, 367; 181/54, 56, 36.4, 36 D

[56] References Cited
UNITED STATES PATENTS

| | | | |
|---|---|---|---|
| 1,775,939 | 9/1930 | Matthaei | 165/155 |
| 1,998,974 | 4/1935 | Sunday | 165/154 |
| 2,130,306 | 9/1938 | Lintern | 165/154 X |
| 2,756,032 | 7/1956 | Dowell | 165/156 X |
| 3,008,642 | 11/1961 | Kofink et al. | 237/12.3 A |
| 3,420,052 | 1/1969 | Miller | 237/12.3 A |

FOREIGN PATENTS OR APPLICATIONS

| 74,826 | 2/1945 | Czechoslovakia | 285/367 |
|---|---|---|---|

*Primary Examiner*—Charles J. Myhre
*Assistant Examiner*—Theophil W. Streule, Jr.
*Attorney, Agent, or Firm*—Harness, Dickey & Pierce

[57] ABSTRACT

A disassemblable exhaust muffler and cabin air heater suitable for use on aircraft engines or the like comprising a plurality of assemblable modules which can be readily disassembled to facilitate periodic inspection and repair of the muffler assembly in accordance with prescribed maintenance and inspection schedules. The muffler assembly includes a perforated exhaust gas conduit having a gas flow obstruction at a position intermediate of the inlet and outlet ends thereof and around which an inner shell is removably disposed defining an inner chamber for sound attenuation which in turn is encircled by a removable outer shell defining an outer chamber through which cabin air is adapted to be passed in heat exchange relationship with respect to the periphery of the inner shell. The outer shell and inner shell are readily disassemblable to expose internal areas to inspection for the presence of any structural defects and for effecting any repair thereof.

11 Claims, 6 Drawing Figures

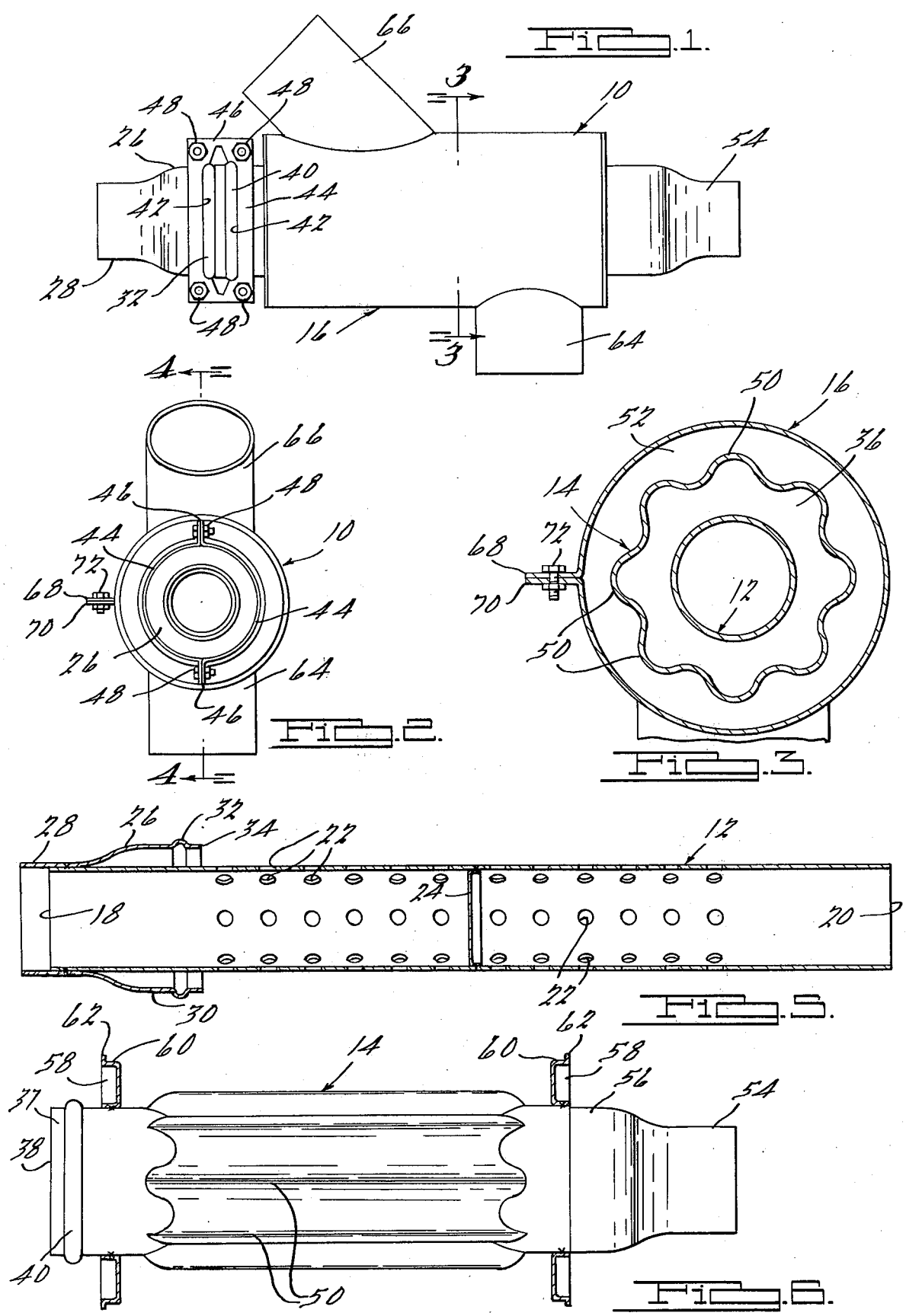

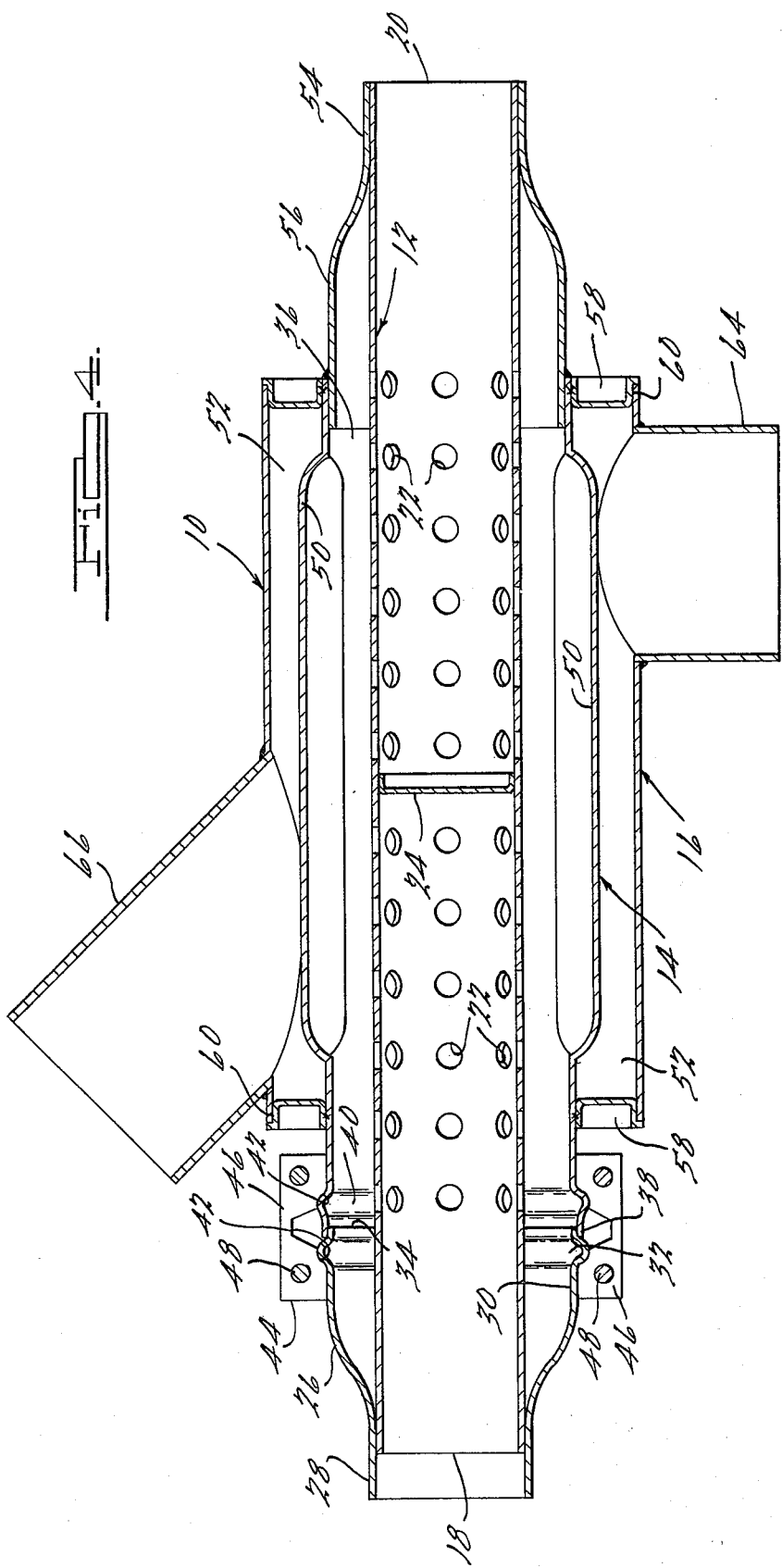

AIRCRAFT MUFFLER AND HEATER ASSEMBLY

BACKGROUND OF THE INVENTION

Rigorous safety standards imposed by the Federal Aviation Agency on aircraft necessitates periodic inspection and annual licensing by certified inspectors to assure airworthiness. Many of the smaller aircraft employed in general aviation are equipped with exhaust system mufflers for reducing engine noise and further include an integral air heater for supplying heated air to the passenger cabin to provide the necessary comfort during flight. The potential safety hazard associated in such combined exhaust muffler cabin heater systems due to leakage of exhaust gases into the heating system requires rigorous inspection of the muffler components on scheduled intervals to make certain that no fractures or cracks have occurred which would result in leakage of exhaust gases into the cabin air heating system.

Aircraft muffler and heater assemblies of the types heretofore known are comprised of integrally welded assemblies of heat-resistant metal alloys which make inspection and repair of such assemblies exceedingly difficult and costly. In some instances, minor fractures and surface imperfections cannot be adequately repaired without a physical cutting of the assembly, requiring extensive rebuilding thereof at high cost. In some instances, minor defects cannot be satisfactorily repaired due to the inaccessibility thereof, necessitating its complete replacement with a new muffler assembly.

The present invention provides a muffler assembly which is readily disassemblable, whereby all critical areas are exposed for careful inspection and testing, and any fractures or defects found can be quickly and completely repaired, so as to restore the assembly to proper working condition and within prescribed safety standards.

SUMMARY OF THE INVENTION

The benefits and advantages of the present invention are achieved by an aircraft muffler and cabin air heater assembly for use on aircraft or the like which comprises an elongated gas flow conduit having an inlet end and an outlet end, and which is formed with an annular connector adjacent to one end portion thereof for coupling an elongated inner shell in encircling spaced relationship around the conduit, forming a substantially gas-tight connection. The inner shell is slidably supported at both ends around the periphery of the gas flow conduit, enabling disassembly of the two units by relative axial movement thereof. The conduit is formed with a plurality of perforations through the walls thereof and is formed with a gas flow obstruction intermediate to the inlet and outlet ends thereof so as to cause exhaust gas to flow through the perforations into an inner or attenuation chamber defined by the periphery of the gas flow conduit and the inner shell from which it again returns through the perforations into the downstream portion of the conduit. An outer shell is removably mounted around the inner shell in spaced relationship defining an outer chamber and the outer shell is formed with an inlet and an outlet for passing air in heat exchange relationship through the outer chamber and in contact with the periphery of the inner shell to effect a heating thereof. Fastening means are provided for removably clamping the outer shell around the inner shell, facilitating a removal thereof for visual inspection of the surface areas within the outer chamber.

The disassemblable construction of the muffler and heater assembly of the present invention substantially simplifies inspection thereof and futher facilitates the repair of any defects present, enabling restoration of the assembly to proper operating condition.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a side elevational view of the assembled exhaust muffler and cabin heater constructed in accordance with the preferred embodiments of the present invention;

FIG. 2 is an end elevational view of the inlet side of the muffler assembly shown in FIG. 1;

FIG. 3 is a magnified transverse vertical sectional view through the muffler assembly shown in FIG. 1 and taken substantially along the line 3—3 thereof;

FIG. 4 is a magnified longitudinal vertical sectional view of the muffler assembly as shown in FIG. 2 and taken substantially along the line 4—4 thereof;

FIG. 5 is an enlarged longitudinal vertical sectional view of the exhaust gas conduit section comprising one unit of the assemblable muffler assembly; and FIG. 6 is an enlarged side elevational view of the inner shell section separate from the exhaust gas conduit and outer shell sections.

DESCRIPTION OF THE PREFERRED EMBODIMENTS

Referring now in detail to the drawings, a muffler and heater assembly 10, as shown in FIG. 1, is comprised of three assemblable and disassemblable components or subassemblies including an exhaust gas conduit 12, as best seen in FIGS. 4 and 5; an inner shell 14, as best seen in FIGS. 3, 4 and 6, which is adapted to overlie a substantial portion of the exhaust gas conduit 12; and an outer shell 16, as best seen in FIGS. 1-4, which is adapted to be removably clamped around the periphery of the inner shell 14.

The exhaust gas conduit 12 is comprised of an elongated tubular conduit having an inlet end 18 and an outlet end 20, as best seen in FIGS. 4 and 5, and is formed with a plurality of perforations 22 through the wall thereof in a region intermediate of its inlet and outlet ends. A gas flow obstruction, which in the specific embodiment illustrated comprises a circular dish-shaped imperforate baffle 24, is securely affixed in transverse relationship at approximately the midpoint of the length of the conduit to an imperforate section of the inner wall thereof. An annular connector or bell-shaped bushing 26 is secured to the inlet end 18 of the conduit and includes a necked down section 28, which slidably overlies the inlet end portion of the conduit and is securely affixed thereto, such as by brazing. The bushing 26 is formed with a rearwardly extending enlarged tubular section 30, which is formed with a radially projecting annular bead 32 extending therearound at a point spaced from its annular edge 34.

The inner shell member 14 is of an elongated tubular configuration and is adapted to be disposed in spaced encircling relationship around the conduit 12 in a manner as best seen in FIGS. 3 and 4, so as to define an inner chamber 36, which is disposed in communication with the interior of the conduit through the perforations 22. The forward or upstream end 37 of the inner shell is of a cross sectional configuration and size such that, upon assembly, the forward end 37 is slidably fitted over the rearward end portion of the tubular section 30 with its annular edge 38 disposed against the base of the annular bead 32 such that a frictional tight relationship between the two members is achieved. An annular outwardly projecting bead 40 extends around the forward end portion 37 of the inner shell at a point spaced from the annular edge 38 thereof. The remote edges of the beads 32 and 40 are adapted to be engaged by the inner edges 42 of a pair of grooved semi-circular or circular clamping members 44 for urging and maintaining the end portions of tubular sections 30 and 37 in firm gas-tight telescopic relationship upon assembly with annular edge 38 abutting the base of bead 32. Each of the clamping members 44 is formed with radially extending diametrically disposed flanges 46 which are adapted to be removably secured, as may be best seen in FIGS. 1 and 2, by means of bolt-type fasteners 48.

The central body portion of the inner shell 14 is formed with a plurality of surface undulations in the form of longitudinally extending flutes 50, which increases the effective surface area thereof and also imparts turbulence to air passing through an outer chamber 52, as defined by the periphery of the inner shell and the inner surface of the outer shell 16. The flutes 50 are formed in a manner so as to not appreciably reduce the wall thickness of the fluted section relative to the wall of the remaining portions of the inner shell.

The rearward or downstream end portion of the inner shell is provided with a necked down section, indicated at 54, which is of a diameter so as to slidably and frictionally engage the outlet end portion of the gas conduit upon assembly, as is best shown in FIG. 4. The slip fit provides a positive expansion joint for the gas conduit and enables disassembly of the inner shell from the gas conduit after removal of the clamping members 44 by axial relative movement of the inner shell in a direction toward the right as viewed in FIG. 4. In accordance with the specific embodiment shown, the necked down section 54 comprises a section of a bell-shaped bushing 56 similar to the bushing 26, which is secured along the edge of its enlarged end to the main portion of the inner shell, such as by welding and brazing.

The inner shell further includes a pair of axially spaced annular flanges 58 of a generally U-shaped cross section which are disposed in opposed relationship and define axially extending shoulders 60 for receiving and supporting the overlying edge portions of the outer shell 16. The annular flanges 58 are preferably provided with a radially extending rib 62 therearound for engaging the edges of the outer shell, preventing relative axial movement therebetween. The inner webs of the annular flanges 58 are rigidly secured to the periphery of the inner shell and define in combination with the outer shell, the outer chamber 52 through which cabin air is circulated.

The outer shell unit 16 is comprised of a flexible metal sheet formed with an inlet port 64 and an outlet port 66 which are adapted to be removably connected to the ductwork of the heater system. The adjacent longitudinal edges of the outer shell are integrally formed with a pair of radially projecting longitudinally extending flanges 68, 70, which are secured upon assembly by a series of bolt-type fasteners 72, thereby securely clamping the outer shell in firm seated relationship against the shoulders 60 of the annular flanges.

The individual components of the muffler assembly can be readily fabricated from a heat-resistant metal or metal alloy, such as a Type 304 stainless steel, and the individual parts, such as the bushings 26 and 56, the baffle 24 and the annular flanges 58, can be initially secured in proper position such as by tungsten inert gas or metallic inert gas tack welding, whereafter the subassemblies can be placed in a brazing furnace and the connections brazed employing a suitable brazing filler metal, such as a nickel-base brazing filler metal commercially available under the trademark Nicrobraz 171 from Wall Colmonoy Corporation. In order to further enhance the heat and corrosion resistance of the exhaust gas conduit and inner shell components, it is preferred to apply a protective surface coating over all surfaces exposed to the hot exhaust gases, such as for example, a nickel-base coating of a thickness ranging from about 0.001 to about 0.003 inch, of which a material commercially available under the trademark Nicrocoat 4, available from Wall Colmonoy Corporation, has been found particularly satisfactory. The brazed components, prior to assembly, can be subjected to further surface finishing in selected areas to provide proper interfitting relationship between the assembled components, whereafter the inner shell and outer shell are assembled about the exhaust gas conduit.

The necked down inlet and outlet ends of the muffler assembly can be removably connected to the exhaust gas tubing of the aircraft exhaust system in accordance with accepted practice.

In operation, and with reference to FIG. 4, the exhaust gases entering the inlet end of the muffler assembly pass through the perforations 22 in the end upstream of the baffle 24 therein and pass into the inner chamber 36, which is sized so as to provide proper sound attenuation of the noise frequencies present. The exhaust gases, after heating the fluted section of the inner shell, thereafter pass back through the perforations 22 into the interior of the conduit and are discharged from the outlet end thereof. Cabin air heat is provided by introducing and circulating air through the outer chamber 52 and in heat exchange relationship with the periphery of the inner shell, and in particular, the fluted portions thereof; whereafter the heated air is withdrawn through the outlet port for return to the cabin. As will be noted in FIG. 4, the outer chamber extends to a point spaced from the connection between the inner shell and the bell-shaped bushing 26, such that any exhaust gas leakage occurring between the slidably telescoped end portions of tubular sections 30 and 37 will harmlessly be discharged to the atmosphere and does not enter the circulating hot air heater system. An assurance of the integrity of the inner shell is provided by subjecting the inner shell subassembly to a pressure test such as up to about 30 psi prior to assembly and also during subsequent periodic inspections as may be desired. It will be apparent from the foregoing that a quick and simple disassembly of the muffler assembly can be effected, exposing all surface areas thereof for inspection and repair, and in some cases, enabling simple replacement of one of the individual components as may be required from time to time.

While it will be apparent that the invention herein described is well calculated to fulfill the benefits and advantages set forth above, it will be appreciated that the invention is susceptible to modification, variation and change without departing from the spirit thereof.

What is claimed is:

1. An aircraft muffler and cabin air heater assembly or the like comprising an elongated gas flow conduit having an inlet end and an outlet end and formed with an annular connector around one end portion thereof, an elongated inner shell disposed in encircling spaced relationship around a substantial portion of said conduit and defining therebetween an annular inner chamber, said inner shell having one end thereof necked down to slidably overlie and engage the other end portion of said conduit and having the opposite end thereof removably coupled to said annular connector at said one end portion forming a substantially gas-tight connection, said conduit formed with a gas flow obstruction at a position intermediate the ends thereof and provided with perforations through the walls thereof in a region upstream and downstream of said obstruction for providing communication between the interior of said conduit and said inner chamber, and an outer shell removably mounted in encircling spaced relationship around said inner shell including axially spaced end walls defining in combination an outer chamber which is axially spaced from said connection, said outer shell formed with inlet means and outlet means for passing air in heat exchange relationship through said outer chamber.

2. The assembly as defined in claim 1, in which said inner shell is formed with a plurality of surface undulations over at least a portion of the area encompassed by said outer chamber to enhance the rate of heat transfer to the air passing through said outer chamber.

3. The assembly as defined in claim 1, in which said obstruction comprises an imperforate baffle extending transversely of the axis of said conduit.

4. The assembly as defined in claim 1, wherein said annular connector comprises a tubular bushing including a necked down section slidably overlying and rigidly affixed to the periphery of said conduit and an enlarged section of a transverse cross sectional configuration and size relative to the transverse cross sectional configuration and size of the opposed end of said inner shell to form a slidable telescopic connection therebetween.

5. The assembly as defined in claim 1, wherein said annular connector includes an enlarged inner end portion having a transverse configuration corresponding to the transverse configuration of the opposed end of said inner shell and adapted to be slidably received in telescopic relationship with the opposed end of said inner shell, and clamping means for removably retaining said inner end portion and said opposed end in substantial sealed telescopic relationship.

6. The assembly as defined in claim 1, wherein said end walls of said outer shell comprise a pair of axially spaced radially projecting annular flanges secured to the periphery of said inner shell, each flange including an axially extending annular shoulder for engaging and supporting the end portions of said outer shell disposed in overlying clamped relationship therearound.

7. The assembly as defined in claim 6, wherein each said flange further includes a radially projecting rib extending around said shoulder to restrict relative axial movement of said outer shell.

8. The assembly as defined in claim 6, wherein said outer shell is comprised of a flexible sheet including longitudinally extending radially projecting flanges along opposed edges thereof, and fastening means along said flanges for securing said flanges together and clamping said outer shell in wrapped relationship around said annular flanges.

9. The assembly as defined in claim 1, wherein said conduit is of a circular tubular configuration of substantially constant diameter and extends in a substantially straight line between its inlet end and its outlet end.

10. The assembly as defined in claim 2, wherein said undulations are in the form of longitudinally extending flutes disposed in spaced circumferentially relationship around said inner shell.

11. The assembly as defined in claim 1, further characterized by the fact that the surfaces of said elongated gas flow conduit and said elongated inner shell exposed to hot exhaust gases are provided with a protective surface coating to further resist hot exhaust gas corrosion and erosion.

\* \* \* \* \*